United States Patent
Peng et al.

(10) Patent No.: US 10,564,837 B2
(45) Date of Patent: Feb. 18, 2020

(54) MOBILE TERMINAL AND METHOD AND DEVICE FOR CONTROLLING TO DISPLAY IN THE SAME

(71) Applicant: GUANGDONG OPPO MOBILE TELECOMMUNICATIONS CORP., LTD., Dongguan (CN)

(72) Inventors: Deliang Peng, Dongguan (CN); Yongpeng Yi, Dongguan (CN); Shengjun Gou, Dongguan (CN); Xiaori Yuan, Dongguan (CN); Gaoting Gan, Dongguan (CN); Zhiyong Zheng, Dongguan (CN); Hai Yang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 193 days.

(21) Appl. No.: 15/798,716

(22) Filed: Oct. 31, 2017

(65) Prior Publication Data
US 2018/0260095 A1    Sep. 13, 2018

(30) Foreign Application Priority Data
Mar. 10, 2017    (CN) .......................... 2017 1 0142943

(51) Int. Cl.
*G06F 3/041*    (2006.01)
*G06F 3/0488*    (2013.01)
(Continued)

(52) U.S. Cl.
CPC .......... *G06F 3/0488* (2013.01); *G06F 3/0416* (2013.01); *G06F 3/0481* (2013.01);
(Continued)

(58) Field of Classification Search
CPC ...... G06F 3/0416; G06F 3/041; G06F 3/0481; G06F 3/0484; G06F 3/0488; G06F 3/04842
See application file for complete search history.

(56) References Cited

U.S. PATENT DOCUMENTS 8,884,981 B2 *    11/2014    Boettcher ............... G06F 9/451
                                                                345/619
9,116,615 B2 *    8/2015    Ng ........................ G06F 3/0481
(Continued)

FOREIGN PATENT DOCUMENTS

CN    101488333 A    7/2009
CN    101847269 A    9/2010
(Continued)

OTHER PUBLICATIONS

European Patent Application No. 17198781.1 extended Search and Opinion dated May 25, 2018, 8 pages.
(Continued)

*Primary Examiner* — Vijay Shankar
(74) *Attorney, Agent, or Firm* — Lathrop Gage LLP

(57) ABSTRACT

Embodiments of the present disclosure disclose a mobile terminal and a method and a device for controlling to display. The method includes: receiving a plurality of layers rendered by an application; determining a target layer from the plurality of layers according to respective layer attribute information corresponding to the plurality of layers, in which, the layer attribute information includes at least one of the following: whether cache data is null, whether a display mode matches other layers, an attribute of at least one visible region, an attribute of at least one transparent region, whether there is at least one updated region in a preset period, and an attribute of the at least one updated region, where the display mode includes a landscape orientation mode or a portrait orientation mode; and composing layers
(Continued)

in the plurality of layers other than the target layer into an image to be displayed, and sending the image to be displayed to a screen for displaying.

20 Claims, 5 Drawing Sheets

(51) Int. Cl.
  *G06F 9/451* (2018.01)
  *G06T 15/00* (2011.01)
  *G06F 3/0481* (2013.01)
  *G06F 3/0484* (2013.01)
  *H04M 1/725* (2006.01)

(52) U.S. Cl.
  CPC .......... *G06F 3/04842* (2013.01); *G06F 9/451* (2018.02); *G06T 15/005* (2013.01); *H04M 1/72522* (2013.01)

(56) References Cited

U.S. PATENT DOCUMENTS

| | | | |
|---|---|---|---|
| 9,805,478 B2* | 10/2017 | Croxford | G06T 11/00 |
| 2009/0058872 A1 | 3/2009 | Boettcher et al. | |
| 2011/0087990 A1 | 4/2011 | Ng et al. | |
| 2016/0217592 A1 | 7/2016 | Croxford et al. | |
| 2017/0329613 A1* | 11/2017 | Croxford | G09G 5/377 |

FOREIGN PATENT DOCUMENTS

| | | |
|---|---|---|
| CN | 101882321 A | 11/2010 |
| CN | 106033450 A | 10/2016 |
| CN | 106055294 A | 10/2016 |
| CN | 106155464 A | 11/2016 |
| CN | 106201550 A | 12/2016 |
| CN | 106331427 A | 1/2017 |
| CN | 106951055 A | 7/2017 |
| GB | 2532940 A | 6/2016 |

OTHER PUBLICATIONS

Chinese Patent Application No. 201710142943.1 English translation of Office Action dated Dec. 4, 2018, 8 pages.
Chinese Patent Application No. 201710142943.1 Office Action dated Dec. 4, 2018, 7 pages.
Chinese Patent Application No. 201710142943.1 English translation of Office Action dated Feb. 1, 2019, 9 pages.
Chinese Patent Application No. 201710142943.1 Office Action dated Feb. 1, 2019, 8 pages.
PCT/CN2017/108501 English translation of the International Search Report and Written Opinion dated Jan. 9, 2018, 12 pages.
Chinese Patent Application No. 201710142943.1 Notification of Registration dated May 28, 2019, 4 pages.
Chinese Patent Application No. 201710142943.1 English translation of Notification of Registration dated May 28, 2019, 5 pages.

* cited by examiner

MOBILE TERMINAL AND METHOD AND DEVICE FOR CONTROLLING TO DISPLAY IN THE SAME

CROSS REFERENCE TO RELATED APPLICATION

This application is based upon and claims priority and benefits of Chinese Patent Application No. 201710142943.1, filed with State Intellectual Property Office on Mar. 10, 2017, the entire content of which is incorporated herein by reference.

FIELD

Embodiments of the present disclosure relates to a display technology field, and more particularly to a mobile terminal and a method and a device for controlling to display in the mobile terminal.

BACKGROUND

At present, a screen of a mobile terminal gets larger and larger, and applications installed in the mobile terminal and functions realized by the mobile terminal get richer and richer. Users may spend a lot of time to use the mobile terminal every day. Therefore, display efficiency and power consumption of the mobile terminal become important indicators of performance of the mobile terminal.

Images are generally displayed in the mobile terminal in units of frames. Each image often includes multiple layers. A process from generation to display of an image is approximately as follows. After an application renders the layers, the rendered layers are composed into an image to be displayed by a layer composition module, and then the image is sent to the screen for displaying. A period of time and resources consumed in the above process may be affected by various factors, thereby affecting the display efficiency and power consumption of the mobile terminal.

SUMMARY

Embodiments of the present disclosure provide a method for controlling to display in a mobile terminal, including: receiving a plurality of layers rendered by an application; determining a target layer from the plurality of layers according to respective layer attribute information corresponding to the plurality of layers, in which, the layer attribute information includes at least one of the following: whether cache data is null, whether a display mode matches other layers, an attribute of at least one visible region, an attribute of at least one transparent region, whether there is at least one updated region in a preset period, and an attribute of the at least one updated region, where the display mode includes a landscape orientation mode or a portrait orientation mode; and composing layers in the plurality of layers other than the target layer into an image to be displayed, and sending the image to be displayed to a screen for displaying.

Embodiments of the present disclosure provide a mobile terminal, including a memory, a processor, and computer programs stored in the memory and executable on the processor. The processor is configured to perform the above method when executes the computer programs.

Embodiments of the present disclosure provide a non-transitory computer-readable storage medium having stored therein instructions that, when executed by a processor of a mobile terminal, causes the mobile terminal to perform the method described above.

DETAILED DESCRIPTION

Figure 1:
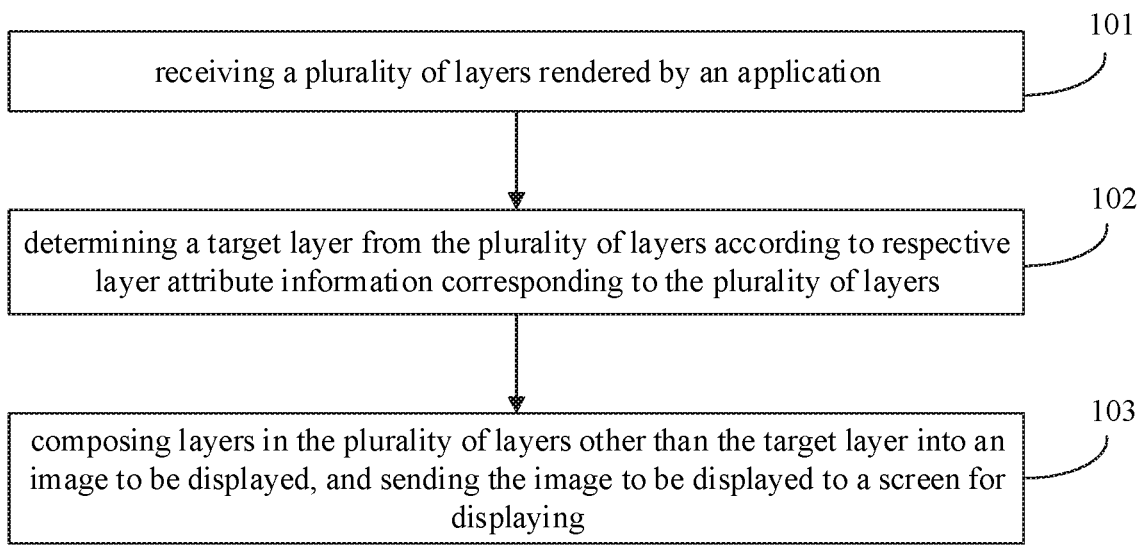
FIG. 1 is a flow chart of a method for controlling to display in a mobile terminal according to an embodiment of the present disclosure.

Technical solutions of the present disclosure will be further described with reference to the following embodiments in combination with drawings. It can be understood that, the embodiments described herein are used to generally interpret the present disclosure, but shall not be construed to limit the present disclosure. In addition, it should be illustrated that, only parts other than all of the structure of the present disclosure are illustrated in the accompanying drawings for ease of description.

Before discussing the exemplary embodiments in more detail, it should be noted that some exemplary embodiments are described as processes or methods depicted in the flow charts. Although the flow chart illustrates the steps as sequential processing, many of the steps can be can be implemented in parallel, concurrently, or simultaneously. In addition, the order of the steps can be rearranged. When it is completed, the processing can be terminated, but may have secondary steps that are not included in the drawings. The processing may correspond to a method, a function, a rule, a sub routine, a sub program, and the like.

FIG. 1 is a flow chart of a method for controlling to display in a mobile terminal according to an embodiment of the present disclosure. The method can be performed by a device for controlling to display in a mobile terminal. The device can be realized by software and/or hardware, which can be integrated in a mobile terminal. As illustrated in FIG. 1, the method includes the following actions.

At block 101, a plurality of layers rendered by an application is received.

In at least one embodiment, the mobile terminal according to embodiments of the present disclosure may be a device including a screen, such as a mobile phone, a smart watch, a tablet computer, a gaming console, a personal digital assistant, a digital multimedia player, and the like.

In at least one embodiment, images can be displayed in units of frames, and each image often includes a plurality of layers. After the application renders the plurality of layers, the plurality of layers rendered by the application can be received by a related Surface Flinger configured to compose the plurality of layers.

An operating system installed in the mobile terminal is not limited in embodiments of the present disclosure. The operating system may be an Android system, a windows phone (WP for short) operating system, an IOS operating system, or the like. In embodiments of the present disclosure, the Android system is taken as an example for ease of the following description.

Figure 2:
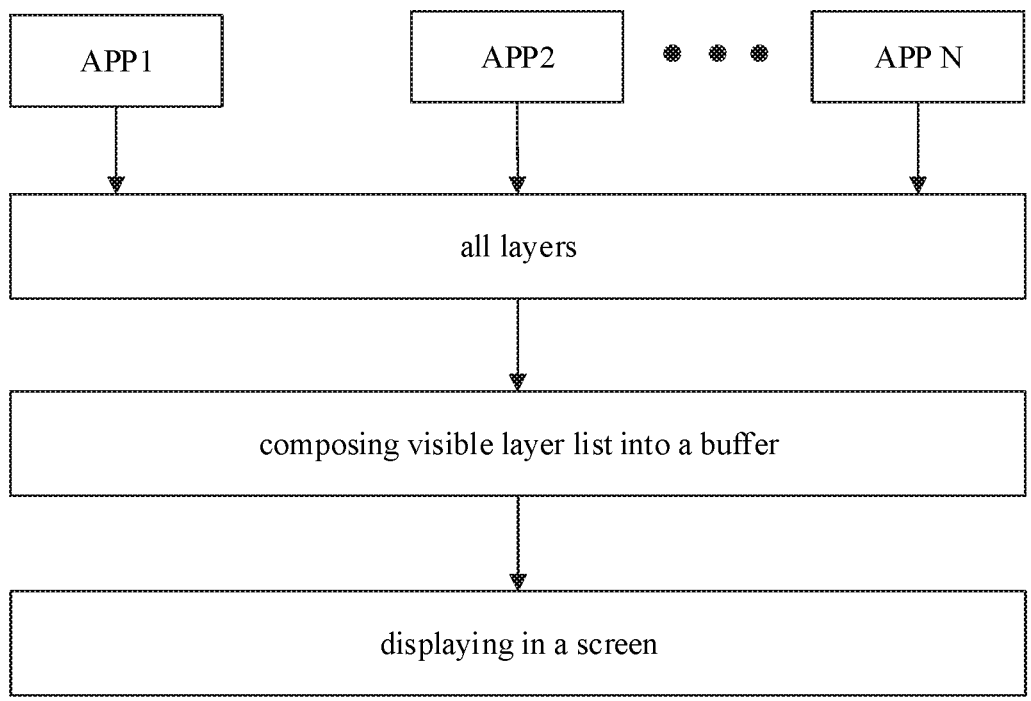
FIG. 2 is a schematic diagram of a display process according to an embodiment of the present disclosure.

A process from generation to display of an image displayed in the Android system is simply described. FIG. 2 is a schematic diagram of a display process according to an embodiment of the present disclosure.

Firstly, at an application layer, each application program (hereinafter referred to as application or APP) contains one or more layers. Each of the APPs (APP1, APP2, . . . , APPN) performs a layer render operation separately according to its own application design (which is generally determined by an Android package (APK for short)). After the render operation is completed, each of the APPs can send all rendered layers to a composition module (Surface Flinger) for composing the layers.

Secondly, at a framework layer, all layers (visible layers and invisible layers) form a layer list, defined as ListAll. The Surface Flinger selects the visible layers from the ListAll to form a visible layer list, defined as DisplayList. Then, the Surface Flinger finds an idle frame buffer (FB for short) from three recyclable FBs in the system. On the idle frame buffer, the Surface Flinger superimposes the layers included in the DisplayList by a composition operation according to application configuration information, to obtain a final image to be displayed. For example, the application configuration information may include: which layer should be arranged at top, which layer should be arranged at bottom, which region should be visible, which region should be transparent, and the like.

Finally, at a kernel layer, the image to be displayed is transferred to display hardware. The display hardware includes a display control and a screen, such that the image to be displayed is finally displayed on the screen. A type of the screen is not limited here, for example, the screen can be a liquid crystal display (LCD for short).

Therefore, in at least one embodiment, this block includes receiving the plurality of visible layers rendered by the application. All the layers below are visible.

At block 102, a target layer is determined from the plurality of layers according to respective layer attribute information corresponding to the plurality of layers.

The layer attribute information includes at least one of the following: whether cache data is null, whether a display mode matches other layers, an attribute of at least one visible region, an attribute of at least one transparent region, whether there is at least one updated region in a preset period, and an attribute of the at least one updated region. The display mode includes a landscape orientation mode or a portrait orientation mode. For one layer, the corresponding cache data is stored in a corresponding cache region. If the cache data is 0, it represents that the cache data is null, and the layer can be regarded as a blank layer. Display modes of the mobile terminal can include the landscape orientation mode and the portrait orientation mode; correspondingly, the landscape orientation mode and the portrait orientation mode for the layer are distinguished when the layer is rendered. It is determined whether the landscape orientation mode or the portrait orientation mode of the layer matches that of other layers according to a preset matching rule of the landscape orientation mode or the portrait orientation mode. For example, a layer is the portrait orientation mode, and most of other layers or a certain layer with an important level is the landscape orientation mode, it is determined to be not matched. For layers with the same name or with the same serial number, the application may render the layers with a given render frame rate. For a currently received layer, it can be compared with layers rendered before (layers received in the preset period), for example, whether a gray value corresponding to each coordinate position is changed, such that it determined whether there is an updated region in the current layer. A specific value of the preset period is not limited in embodiments of the present disclosure.

Further, the attribute of the at least one visible region may include at least one of: whether each of the at least one visible region is null, and the number of the at least one visible region, a shape, a size and a position of each of the at least one visible region. The attribute of the at least one transparent region may include at least one of: the number of the at least one transparent region, a shape, a size and a position of each of the at least one transparent region, and a relative position with a visible region of other layers. The attribute of the at least one updated region may include at least one of: the number of the at least one updated region, a position, a shape and a size of each of the at least one updated region, and a ratio of an area of each of the at least one updated region to an area of the screen. After the application renders one layer, the cache data corresponding to this layer includes coordinate information of the at least one visible region in the layer. The visible region is a rectangle generally, and when coordinates of four vertexes of the rectangle are same, the visible region can be regarded as null.

Above lists multiple types of layer attribute information. When the target layer is determined, it can be determined whether one layer can be the target layer according to any one or a combination of multiple of them. Certainly, there can be other layer attribute information that is combined with the above listed. The target layer may be a layer without actual content or a layer that does not need to display according to a current display scene. A condition for determining the target layer can be set according to actual display demand, which is not specifically limited.

At block 103, layers in the plurality of layers other than the target layer are composed into an image to be displayed, and the image to be displayed is sent to a screen for displaying.

In at least one embodiment, the layers in the plurality of layers other than the target layer can be composed by the Surface Flinger to obtain the image to be displayed, and the image to be displayed is sent to the screen. The screen performs display refresh after receiving the image to be displayed.

Figure 3:
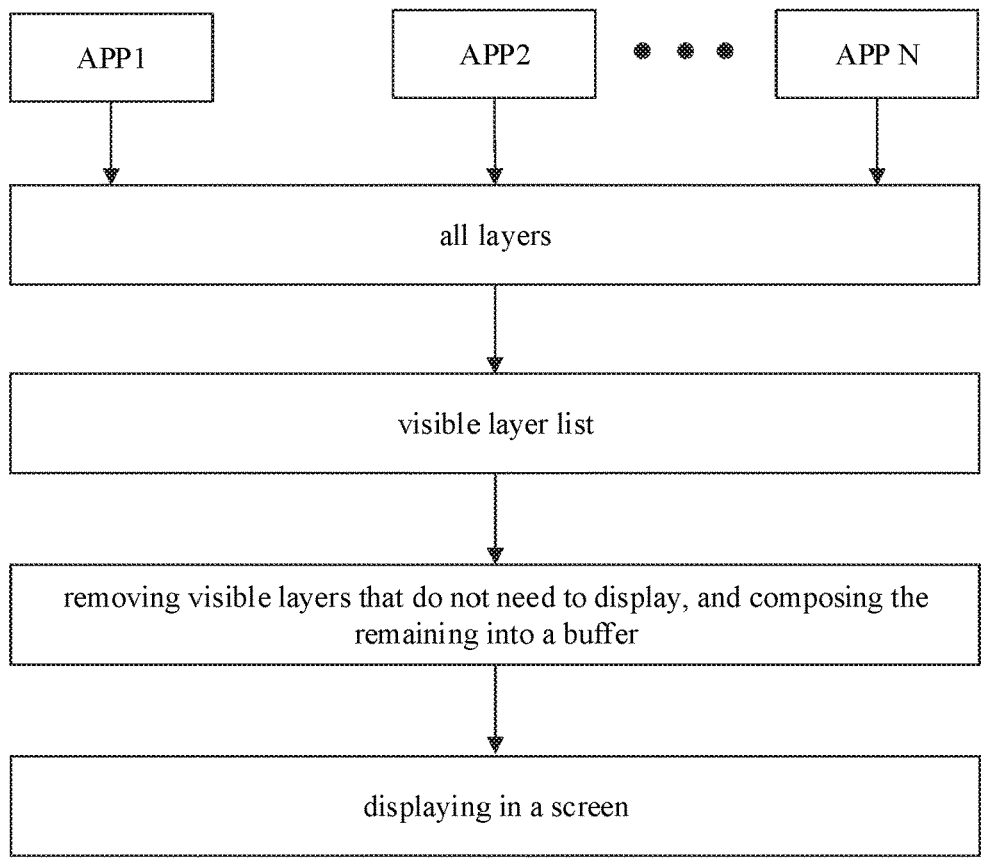
FIG. 3 is a schematic diagram of a display process according to another embodiment of the present disclosure.

FIG. 3 is a schematic diagram of a display process according to another embodiment of the present disclosure. It can be known by comparing with FIG. 2, in at least one embodiment of the present disclosure, after the visible layer list is determined, visible layers (the target layers) that do not need to display can be removed from the visible layer list by the Surface Flinger, then layers remained are composed into a buffer to obtain a composed image, and the composed image is sent to the screen for displaying, thereby reducing the number of layers to be composed, thus improving speed for composing layers.

With the method for controlling to display in a mobile terminal provided in embodiments of the present disclosure, the plurality of layers rendered by the application is received, the target layer is determined from the plurality of layers according to the respective layer attribute information corresponding to the plurality of layers, in which, the layer attribute information includes at least one of the following: whether the cache data is null, whether the display mode matches other layers, the attribute of the at least one visible region, the attribute of the at least one transparent region, whether there is the at least one updated region in the preset period, and the attribute of the at least one updated region, the display mode includes the landscape orientation mode or the portrait orientation mode, the layers in the plurality of layers other than the target layer are composed into the image to be displayed, and the image to be displayed is sent to the screen for displaying. By using the above technical solutions, the layers can be filtrated according to the respective layer attribute information of the layers, thereby realizing that the layers rendered by the application are selectively composed, and reducing the number of layers to be composed, thus improving display efficiency and saving power consumption of the mobile terminal.

Based on the above technical solution, when the layers in the plurality of layers other than the target layer are composed into the image to be displayed and the image to be displayed is sent to the screen for displaying, the method further includes prohibiting playing a voice corresponding to the target layer. For example, the target layer may be a layer corresponding to a video advertisement, or a layer with sound effects, at the same time the layers are composed, the target layer is shielded, operations relative to processes such as voice synthesis and operations for playing the voice can be reduced, thereby further reducing the power consumption of the mobile terminal.

Figure 4:
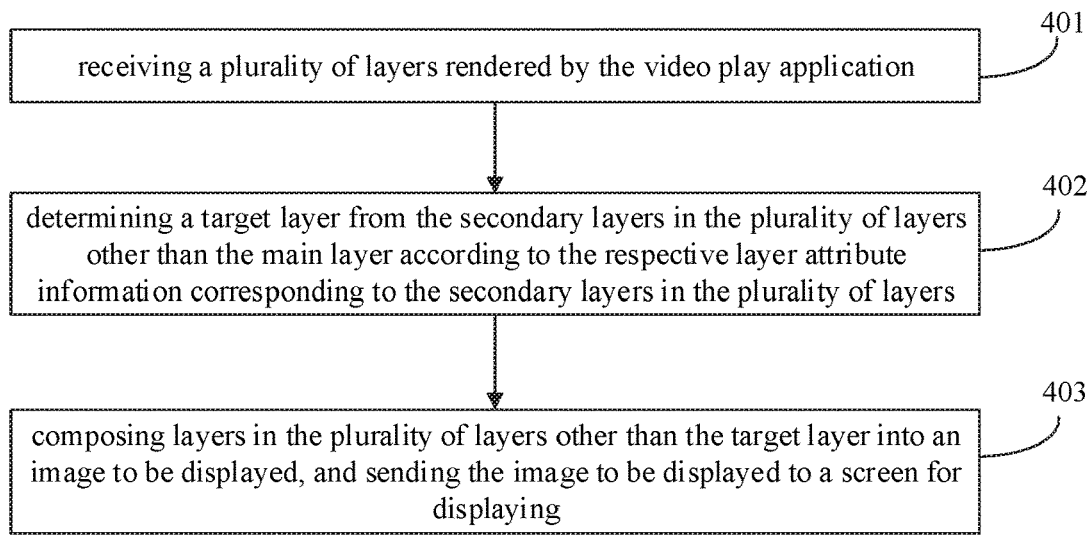
FIG. 4 is a flow chart of a method for controlling to display in a mobile terminal according to another embodiment of the present disclosure.

FIG. 4 is a flow chart of a method for controlling to display in a mobile terminal according to another embodiment of the present disclosure, in which, a video play application is taken as an example for description. A layer corresponding to a main video image in the plurality of layers is a main layer. The method includes the following actions.

At block 401, a plurality of layers rendered by the video play application is received.

A situation of online play of the video play application is taken as an example for description in embodiments of the present disclosure. When a general video play application plays a video online, the video play application may use display modes of three layers. The three layers include a layer for displaying video content, defined as U1, and two Surface View layers. One of the two Surface View layers is configured to display barrage content, defined as U2, and the other one of the two Surface View layers is configured to display controls (such as play progress bar, volume control bar, and various control buttons) and advertisements in a user interface (UI for short), defined as U3. Since the advertisements may be a dynamic short film, in order to distinguish the advertisement and video that are actually played by the video play application, the video that is actually played is defined as a main video, an image corresponding to the main video is the main video image, and the main video image is defined as the main layer. That is, U1 is the main layer, which is located below U2 and U3, and layers other than the main layer are defined as secondary layers.

At block 402, a target layer is determined from the secondary layers in the plurality of layers other than the main layer according to the respective layer attribute information corresponding to the secondary layers in the plurality of layers.

For example, the following operations can be performed on each of the secondary layers other than the main layer in the plurality of the layers.

1, when cache data of a first secondary layer is null, the first secondary layer is determined as the target layer. 2, when the at least one visible region of the first secondary layer is null, the first secondary layer is determined as the target layer. 3, when the main layer is in the landscape orientation mode and the first secondary layer is in the portrait orientation mode, the first secondary layer is determined as the target layer. 4, when the main layer is in the portrait orientation mode and the first secondary layer is in the landscape orientation mode, the first secondary layer is determined as the target layer. 5, when the main layer is in a full screen mode and a visible region or a transparent region of the first secondary layer is one rectangle with any side length equal to a side length of the screen, the first secondary layer is determined as the target layer. 6, when a visible region of the first secondary layer contains a visible region of the main layer, the first secondary layer is determined as the target layer. 7, when there is no updated region in the preset period, the first secondary layer is determined as the target layer.

In this action, since the main layer corresponds to the main video image, being most important content that a user views, the main layer can be directly excluded. That is the main layer may not be determined as the target layer. Therefore, the target layer is determined by judging the secondary layers except the main layer one by one. Above gives some judging modes, one or more of which can be selected in actual application, and it is not limited in embodiments of the present disclosure.

In the following, U2 and U3 will be taken as an example for illustrating above judging modes in detail.

In a first mode, when U2 or U3 triggers layer update, the APP may perform corresponding layer render. However, a result of the layer render may be that cache data is null, i.e., U2 or U3 does not contain content to be displayed, and U2 or U3 is a blank layer. At this time, U2 or U3 can be determined as the target layer.

In a second mode, when the at least one visible region of U2 or U3 is null, it represents that coordinate information corresponding to the at least one visible region corresponds to one point rather than a region. Therefore, U2 or U3 also does not contain content to be displayed. At this time, U2 or U3 can be determined as the target layer.

In a third mode and a fourth mode, display modes of U2 and U3 may be same as a display mode of U1. If a display mode of U2 or U3 is not same as the display mode of U1, and U2 or U3 is still displayed, a disorder may appear in the displayed image, and view directions of barrages, advertisements and UI controls do not coincide with a view direction of the main video image, thereby causing that the user can not view properly. Therefore, U2 or U3 can be determined as the target layer.

In a fifth mode, U1 is the full screen mode and a visible region or a transparent region of U2 or U3 is one rectangle with any side length equal to a side length of the screen. The "one" here is relative to "a number of", that is, U2 or U3 only includes one visible region or one transparent region, such that the UI controls are excluded. The UI controls should be remained because the UI controls to be displayed in the video play process usually include a number of visible regions. While the respective advertisements and barrages are one single rectangle, and when a width or a length of the rectangle is equal to a width or a length of the screen, the advertisements and barrages may cause a large block area to the main video image. Therefore, U2 or U3 that satisfy above conditions can be determined as the target layer.

Figure 5:
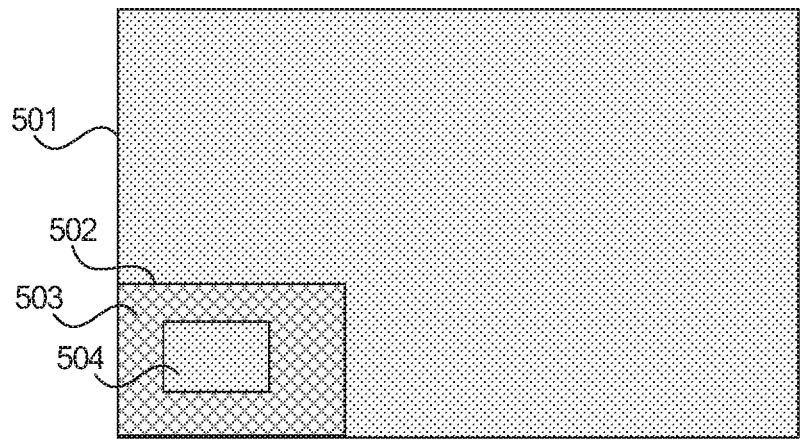
FIG. 5 is a schematic diagram of a layer superposition according to an embodiment of the present disclosure.

In a sixth mode, FIG. 5 is a schematic diagram of a layer superposition according to an embodiment of the present disclosure, in which, a second layer 502 is superposed on a first layer 501 (at least one region of the first layer 501 is visible), and the second layer 502 contains a visible region 503 and a transparent region 504. The transparent region 504 reveals some contents of the first layer 501. If the first layer 501 is U1, and the second layer 502 is U2 or U3, when a transparent region of U2 or U3 contains the visible region of U1, this superposing mode is not reasonable, hindering normal viewing of the user. Therefore, U2 or U3 can be determined as the target layer at this time.

In a seventh mode, when there is no updated region in U2 or U3 in the preset period, contents contained by U2 or U3 do not change, and the user may no longer need to view contents in U2 or U3. Therefore, U2 or U3 can be determined as the target layer at this time. It can be understood that, after U2 or U3 is determined as the target layer, U2 or U3 can be excluded when the layer superposition is performed. That is U2 or U3 is removed from DisplayList. When there is new content updated in U2 or U3, U2 or U3 can be added to DisplayList again to participate in superposition.

At block 403, layers in the plurality of layers other than the target layer are composed into an image to be displayed, and the image to be displayed is sent to a screen for displaying.

In embodiments of the present disclosure, the video play application is taken as an example for illustration, and the layers can be filtrated according to the respective layer attribute information of the layers contained in the video play application, thereby realizing that layers rendered by the video play application are selectively composed, and reducing the number of layers to be composed, thus improving display efficiency and saving power consumption of the mobile terminal.

Figure 6:
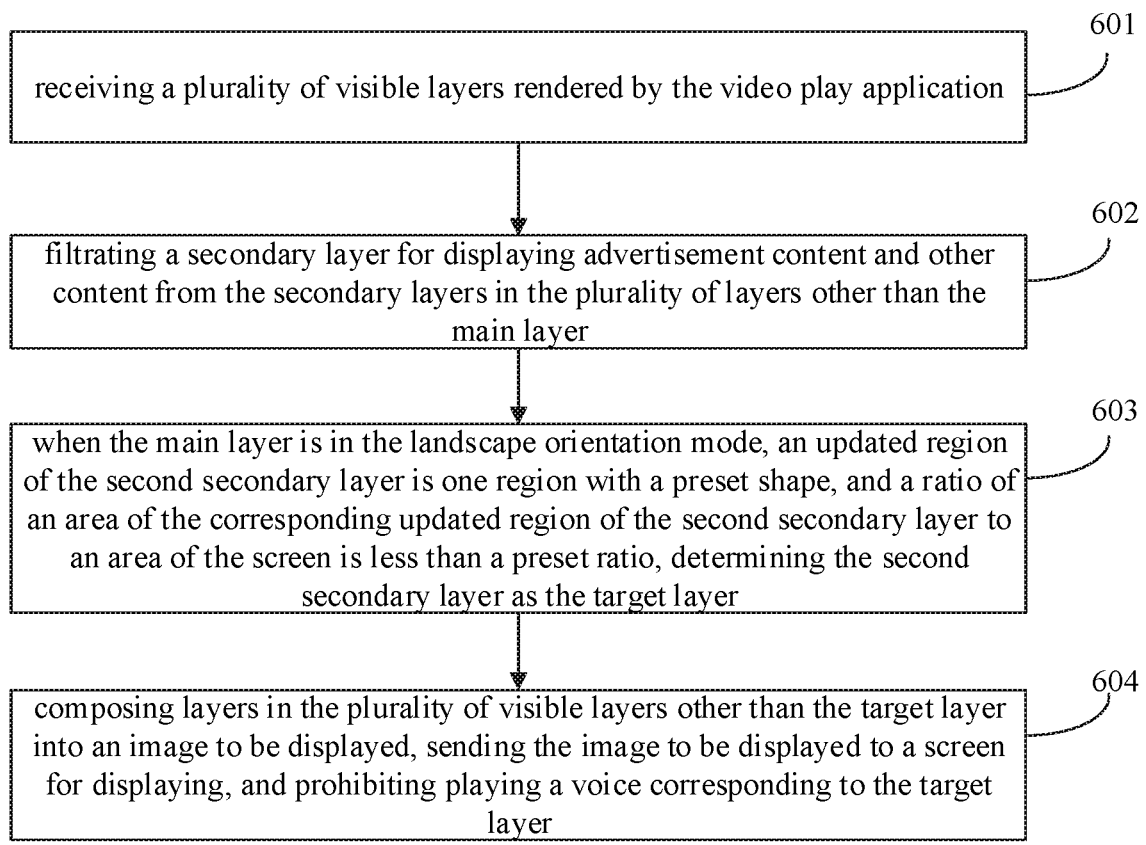
FIG. 6 is a flow chart of a method for controlling to display in a mobile terminal according to another embodiment of the present disclosure.

FIG. 6 is a flow chart of a method for controlling to display in a mobile terminal according to another embodiment of the present disclosure. This method can be applied to a situation of removing advertisements in a process that a video play application plays a video. As illustrated in FIG. 6, the method includes the following actions.

At block 601, a plurality of visible layers rendered by the video play application is received.

At block 602, a secondary layer for displaying advertisement content and other content is filtrated from the secondary layers in the plurality of layers other than the main layer.

For a general video play application, advertisements and the UI controls are at a same layer, such as U3 mentioned above. Therefore, the other content in this block may be the UI controls. Certainly, the advertisements may also be in a same layer with contents other than the UI controls. The other content is not limited in embodiments of the present disclosure.

At block 603, when the main layer is in the landscape orientation mode, an updated region of the second secondary layer is one region with a preset shape, and a ratio of an area of the corresponding updated region of the second secondary layer to an area of the screen is less than a preset ratio, the second secondary layer is determined as the target layer.

For example, the preset ration can be set according to actual situation, such as 1/3. The "one" here is relative to "a number of", that is, the updated region is only one. The preset shape is rectangle.

Figure 7:
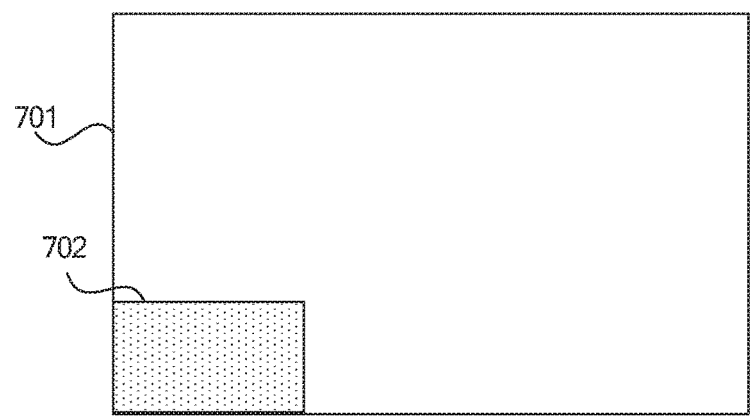
FIG. 7 is a schematic diagram of a video play interface according to an embodiment of the present disclosure.

FIG. 7 is a schematic diagram of a video play interface according to an embodiment of the present disclosure. As illustrated in FIG. 7, in a full screen play interface 701, an updated region 702 of the secondary layer is one single rectangle, and a ratio of an area of the rectangle to an area of the screen is less than 1/3, then it can be determined that the secondary layer only contains advertisements currently, and the secondary layer can be determined as the target layer, thus achieving an objective to remove the advertisements. It can be understood that, when the secondary layer does not satisfy above conditions, the secondary layer can be added to DisplayList again to participate in superposition.

Figure 8:
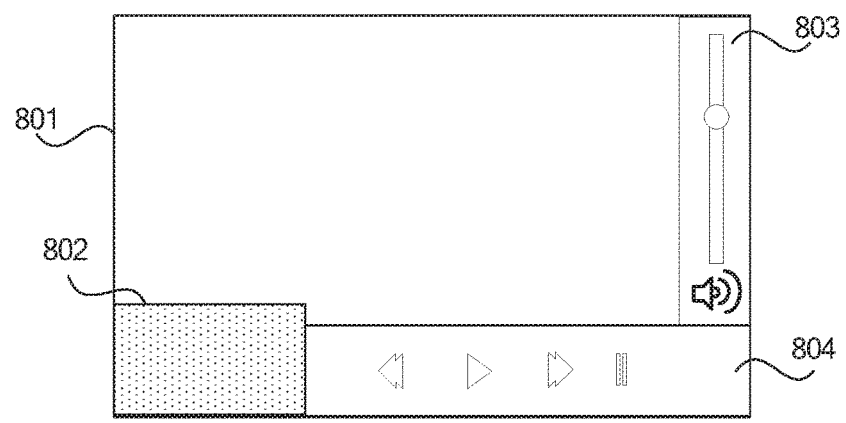
FIG. 8 is a schematic diagram of a video play interface according to another embodiment of the present disclosure.

FIG. 8 is a schematic diagram of a video play interface according to another embodiment of the present disclosure. As illustrated in FIG. 8, in a full screen play interface 801, the secondary layer contains a first updated region 802, a second updated region 803, and a third updated region 804, rather than one single rectangle. Therefore, in order to ensure normal display of contents in the secondary layer other than the advertisements, the secondary can not be determined as the target layer.

At block 604, layers in the plurality of visible layers other than the target layer are composed into an image to be displayed, the image to be displayed is sent to a screen for display, and playing a voice corresponding to the target layer is prohibited.

In embodiments of the present disclosure, by using the above technical solutions, when the advertisements and other content are at the same layer, it can be recognized whether the layer contains the advertisement content only in the video play process. When the layer contains the advertisement content only, the layer is determined as the target layer, i.e., the layer does not participate in the superposition. At the same time the advertisements are removed, the number of layers to be composed can be reduced, thus improving display efficiency and saving power consumption of the mobile terminal.

Figure 9:
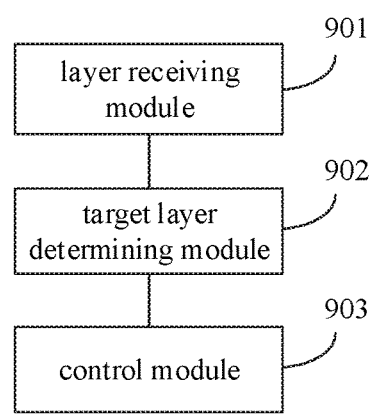
FIG. 9 is a block diagram of a device for controlling to display in a mobile terminal according to an embodiment of the present disclosure.

FIG. 9 is a block diagram of a device for controlling to display in a mobile terminal according to an embodiment of the present disclosure. The device can be realized by software and/or hardware, which can be integrated in the mobile terminal. The device can control the display of the mobile terminal by performing a method for controlling to display in a mobile terminal. As illustrated in FIG. 9, the device includes a layer receiving module 901, a target layer determining module 902 and a control module 903.

The layer receiving module 901 is configured to receive a plurality of layers rendered by an application.

The target layer determining module 902 is configured to determine a target layer from the plurality of layers according to respective layer attribute information corresponding to the plurality of layers. The layer attribute information includes at least one of the following: whether cache data is null, whether a display mode matches other layers, an attribute of at least one visible region, an attribute of at least one transparent region, whether there is at least one updated region in a preset period, and an attribute of the at least one updated region. The display mode includes a landscape orientation mode or a portrait orientation mode.

The control module 903 is configured to compose layers in the plurality of layers other than the target layer into an image to be displayed, and to send the image to be displayed to a screen for displaying.

The device for controlling to display in a mobile terminal provided in embodiments of the present disclosure can filtrate the layers according to the respective layer attribute information of the layers, realizing that layers rendered by the application are selectively composed, and reducing the number of layers to be composed, thus improving display efficiency and saving power consumption of the mobile terminal.

Alternatively, the attribute of the at least one visible region includes at least one of the following: whether each of the at least one visible region is null, the number of the at least one visible region, a shape of each of the at least one visible region, a size of each of the at least one visible region, and a position of each of the at least one visible region.

The attribute of the at least one transparent region includes at least one of the following: the number of the at least one transparent region, a shape of each of the at least one transparent region, a size of each of the at least one transparent region, a position of each of the at least one transparent region, and a relative position to a visible region of other layers.

The attribute of the at least one updated region includes at least one of the following: the number of the at least one updated region, a position of each of the at least one updated region, a shape of each of the at least one updated region, a size of each of the at least one updated region, and a ratio of an area of each of the at least one updated region to an area of the screen.

Alternatively, the application includes a video play application. A layer corresponding to a main video image in the plurality of layers is a main layer.

The target layer determining module 902 is configured to determine the target layer from secondary layers in the plurality of layers other than the main layer according to the respective layer attribute information corresponding to the secondary layers in the plurality of layers.

Alternatively, the target layer determining module 902 is configured to perform the following operations on the respective secondary layers.

When cache data of a first secondary layer is null, the target layer determining module 902 is configured to determine the first secondary layer as the target layer.

Or, when the at least one visible region of the first secondary layer is null, the target layer determining module 902 is configured to determine the first secondary layer as the target layer.

Or, when the main layer is in the landscape orientation mode and the first secondary layer is in the portrait orientation mode, the target layer determining module 902 is configured to determine the first secondary layer as the target layer.

Or, when the main layer is in the portrait orientation mode and the first secondary layer is in the landscape orientation mode, the target layer determining module 902 is configured to determine the first secondary layer as the target layer.

Or, when the main layer is in a full screen mode and a visible region or a transparent region of the first secondary layer is one rectangle with any side length equal to a side length of the screen, the target layer determining module 902 is configured to determine the first secondary layer as the target layer.

Or, when a visible region of the first secondary layer contains a visible region of the main layer, the target layer determining module 902 is configured to determine the first secondary layer as the target layer.

Or, when there is no updated region in the preset period, the target layer determining module is configured to determine the first secondary layer as the target layer.

Alternatively, the target layer determining module 902 is configured to filtrate a second secondary layer for displaying advertisement content and other content from the secondary layers in the plurality of layers other than the main layer, and to determine the second secondary layer as the target layer when the main layer is in the landscape orientation mode, an updated region of the second secondary layer is one region with a preset shape, and a ratio of an area of the corresponding updated region of the second secondary layer to an area of the screen is less than a preset ratio.

Alternatively, the device further includes a voice control module. The voice control module is configured to prohibit playing a voice corresponding to the target layer when the layers in the plurality of layers other than the target layer are composed into the image to be displayed and the image to be displayed is sent to the screen for display.

Figure 10:
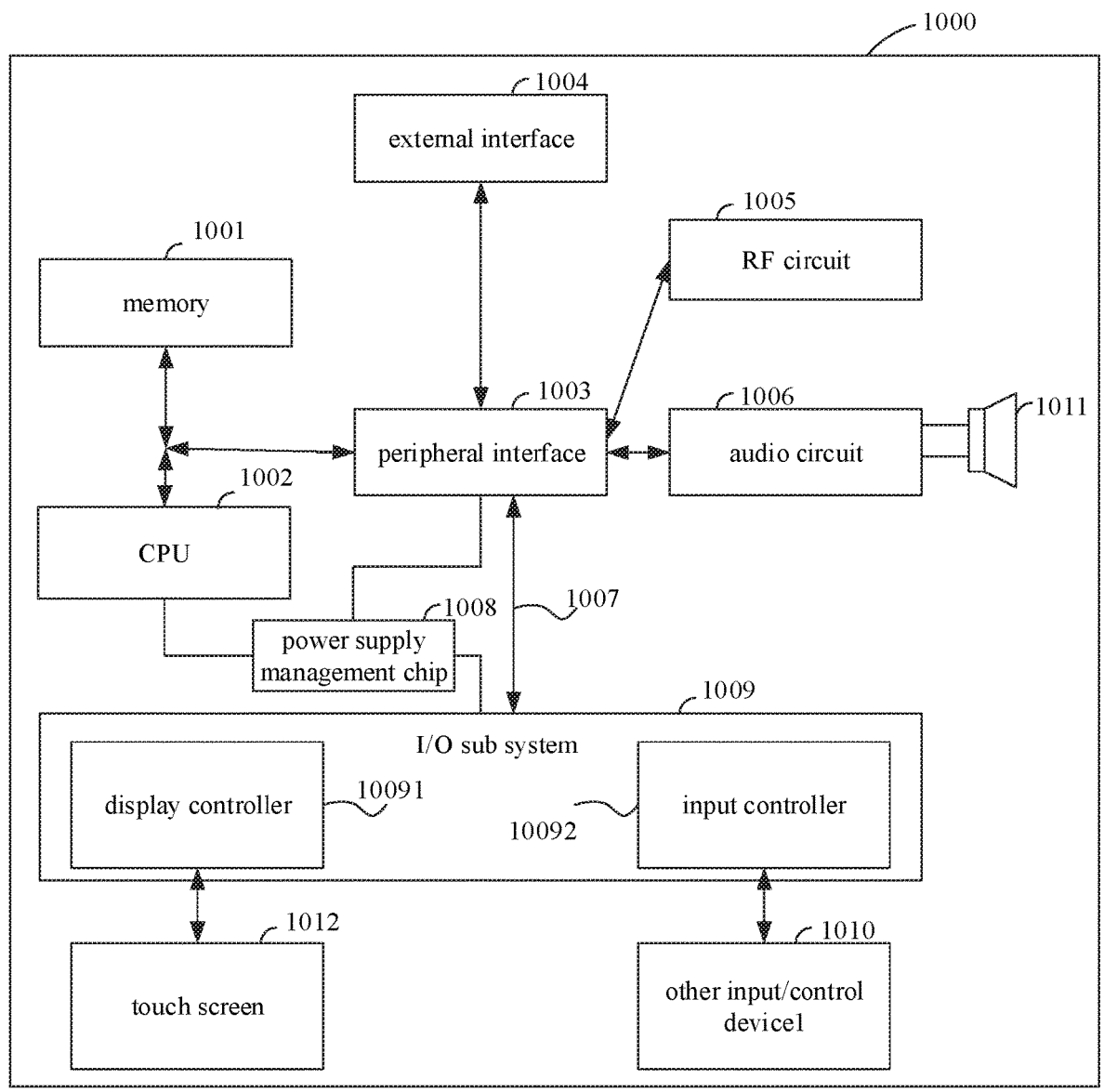
FIG. 10 is a block diagram of a mobile terminal according to an embodiment of the present disclosure.

Embodiments of the present disclosure provide a mobile terminal. The mobile terminal can be integrated with the device for controlling to display in a mobile terminal provided in embodiments of the present disclosure. FIG. 10 is a block diagram of a mobile terminal according to an embodiment of the present disclosure. As illustrated in FIG. 10, the mobile terminal may include a housing (not illustrated in FIG. 10), a memory 1001, a central processing unit (CPU for short) 1002 (also referred to as a processor), a circuit board (not illustrated in FIG. 10) and a power supply circuit (not illustrated in FIG. 10). The circuit board is located in a space formed by the housing. The CPU 1002 and the memory 1001 are arranged on the circuit board. The power supply circuit is configured to supply power for each circuit or component in the mobile terminal. The memory 1001 is configured to store executable program codes. The CPU 1002 is configured to execute a program corresponding to the executable program codes by reading the executable program codes stored in the memory 1001 so as to perform the following acts. A plurality of layers rendered by an application is received. A plurality of layers rendered by an application is received. A target layer is determined from the plurality of layers according to respective layer attribute information corresponding to the plurality of layers. The layer attribute information includes at least one of the following: whether cache data is null, whether a display mode matches other layers, an attribute of at least one visible region, an attribute of at least one transparent region, whether there is at least one updated region in a preset period, and an attribute of the at least one updated region. The display mode comprises a landscape orientation mode or a portrait orientation mode. Layers in the plurality of layers other than the target layer are composed into an image to be displayed, and the image to be displayed is sent to a screen for displaying.

The mobile terminal further includes a peripheral interface 1003, a RF (radio frequency) circuit 1005, an audio circuit 1006, a loudspeaker 1011, a power supply management chip 1008, an input/output (I/O for short) sub system 1009, a touch screen 1012, other input/control devices 1010, and an external interface 1004. These components communicate with each other via one or more communication buses or signal lines 1007.

It should be understood that the illustrated mobile terminal 1000 is only one example and the mobile terminal 1000 may have more or fewer components than illustrated, may combine two or more components, or have a different component configuration. The various components illustrated may be implemented in hardware, software, or a combination of hardware and software, such as one or more signal processing and/or specific integrated circuits.

The mobile terminal for controlling to display provided in the embodiment will be described in detail below, and the mobile terminal takes a mobile phone as an example.

The memory 1001 can be accessed by the CPU 1002, the peripheral interface 1003, and the like. The memory 1001 may include a high-speed random access memory, and may further include a non-volatile memory, such as one or more disk storage devices, flash memory devices, or other volatile solid state memory devices.

The peripheral interface 1003 can connect input and output peripherals of a device to the CPU 1002 and the memory 1001.

The I/O sub system 1009 can connect the input and output peripherals (such as the touch screen 1012 and the other input/control devices 1010) of the device to the peripheral interface 1003. The I/O sub system 1009 can include a display controller 10091 and one or more input controllers 10092 configured to control the other input/control devices 1010. The one or more input controllers 10092 receive electrical signals from the other input/control devices 1010 or send electrical signals to the other input/control devices 1010. The other input/control devices 1010 may include physical buttons (such as pressing buttons, rocker buttons, and the like), a dial pad, a slide switch, a joystick, and a click wheel. It is to be noted that, the input controller 10092 may be connected with any one of a keyboard, an infrared port, a USB interface, and a pointing device such as a mouse.

The touch screen 1012 is an input interface and an output interface between a user terminal and a user, which can display a visible output to the user. The visible output may include graphs, text, icons, videos, and the like.

The display controller 10091 in the I/O sub system 1009 receives electrical signals from the touch screen 1012 or sends electrical signals to the touch screen 1012. The touch screen 1012 detects a touch on the touch screen 1012. The display controller 10091 converts the detected touch into an interaction with a user interface object displayed on the touch screen 1012, thus realizing human-computer interaction. The user interface object displayed on the touch screen 1012 may be an icon of a running game, an icon that links to a corresponding network, and the like. It is to be noted that, the device may also include a light mouse. The light mouse is a touch sensitive surface that does not display the visible output, or is an extension of a touch sensitive surface formed by the touch screen.

The RF circuit 1005 is mainly configured to establish communication between the mobile phone and a wireless network (i.e. a network side), so as to realize receiving and sending data between the mobile phone and the wireless network, such as receiving and sending messages, e-mails, and the like. In detail, the RF circuit 1005 receives and transmits an RF signal. The RF signal is also called an electromagnetic signal. The RF circuit 1005 converts an electoral signal into an electromagnetic signal, or converts an electromagnetic signal into an electoral signal. The RF circuit 1005 communicates with a communication network or other devices via the electromagnetic signal. The RF circuit 1005 may include a known circuit for performing these functions. The known circuit includes but is not limited to an antenna system, an RF transceiver, one or more amplifiers, a tuner, one or more oscillators, a digital signal processor, a CODEC (COder-DECoder) chipset, a subscriber identity module (SIM for short), and the like.

The audio circuit 1006 is mainly configured to receive audio data from the peripheral interface 1003, to convert the audio data into an electrical signal, and to transmit the electrical signal to the loudspeaker 1011.

The loudspeaker 1011 is configured to restore a voice signal received by the mobile phone from the wireless network via the RF circuit 1005 to a sound, and to play the sound to the user.

The power supply management chip 1008 is configured to supply power for the CPU 1002, the I/O sub system 1009, and hardware connected to the peripheral interface 1003, and to perform power supply management.

The device for controlling to display in a mobile terminal and the mobile terminal provided in the above embodiments can perform the method for controlling to display in a mobile terminal provided in any of the embodiments of the present disclosure, having corresponding function modules for performing the method and advantageous effect. The technical details that are not described in detail in the above embodiments can be found in the method for controlling to display in a mobile terminal provided in any of the embodiments of the present disclosure.

It should be noted that, the foregoing is only a preferred embodiment of the present disclosure and technical principles employed. The present disclosure is not limited to the specific embodiments described herein. Various obvious changes, readjustments and substitutions that can be made by those skilled in the art are not departed from the scope of the present disclosure. Thus, while the present disclosure has been described in more detail by way of the above examples, the present disclosure is not limited to the above embodiments, and may include more and more equivalent embodiments without departing from the inventive concept, and the present disclosure is determined by the scope of the claims.

What is claimed is:

1. A method for controlling to display in a mobile terminal, comprising:
receiving a plurality of layers rendered by an application;
determining a target layer from the plurality of layers according to respective layer attribute information corresponding to the plurality of layers, wherein, the layer attribute information comprises at least one of the following: whether cache data is null, whether a display mode matches other layers, an attribute of at least one visible region, an attribute of at least one transparent region, whether there is at least one updated region in a preset period, and an attribute of the at least one updated region, in which the display mode comprises a landscape orientation mode or a portrait orientation mode; and
composing layers in the plurality of layers other than the target layer into an image to be displayed, and sending the image to be displayed to a screen for displaying,
wherein, the attribute of the at least one visible region comprises at least one of the following:
whether each of the at least one visible region is null, the number of the at least one visible region, a shape of each of the at least one visible region, a size of each of the at least one visible region, and a position of each of the at least one visible region;
the attribute of the at least one transparent region comprises at least one of the following:
the number of the at least one transparent region, a shape of each of the at least one transparent region, a size of each of the at least one transparent region, a position of each of the at least one transparent region, and a relative position to a visible region of other layers;

the attribute of the at least one updated region comprises at least one of the following:
the number of the at least one updated region, a position of each of the at least one updated region, a shape of each of the at least one updated region, a size of each of the at least one updated region, and a ratio of an area of each of the at least one updated region to an area of the screen.

2. The method according to claim 1, wherein receiving a plurality of layers rendered by an application comprises:
receiving a plurality of visible layers rendered by an application.

3. The method according to claim 1, wherein the application comprises a video play application, a layer corresponding to a main video image in the plurality of layers is a main layer;
determining a target layer from the plurality of layers according to respective layer attribute information corresponding to the plurality of layers comprises:
determining the target layer from secondary layers in the plurality of layers other than the main layer according to the respective layer attribute information corresponding to the secondary layers in the plurality of layers.

4. The method according to claim 2, wherein the application comprises a video play application, a layer corresponding to a main video image in the plurality of layers is a main layer;
determining a target layer from the plurality of layers according to respective layer attribute information corresponding to the plurality of layers comprises:
determining the target layer from secondary layers in the plurality of visible layers other than the main layer according to the respective layer attribute information corresponding to the secondary layers in the plurality of layers.

5. The method according to claim 3, wherein determining the target layer from secondary layers in the plurality of layers other than the main layer according to the respective layer attribute information corresponding to the secondary layers in the plurality of layers comprises:
performing the following operations on the respective secondary layers:
when cache data of a first secondary layer is null, determining the first secondary layer as the target layer; or
when the at least one visible region of the first secondary layer is null, determining the first secondary layer as the target layer; or
when the main layer is in the landscape orientation mode and the first secondary layer is in the portrait orientation mode, determining the first secondary layer as the target layer; or
when the main layer is in the portrait orientation mode and the first secondary layer is in the landscape orientation mode, determining the first secondary layer as the target layer; or
when the main layer is in a full screen mode and a visible region or a transparent region of the first secondary layer is one rectangle with any side length equal to a side length of the screen, determining the first secondary layer as the target layer; or
when a visible region of the first secondary layer contains a visible region of the main layer, determining the first secondary layer as the target layer; or
when there is no updated region in the preset period, determining the first secondary layer as the target layer.

6. The method according to claim 3, wherein, determining the target layer from secondary layers in the plurality of layers other than the main layer according to the respective layer attribute information corresponding to the secondary layers in the plurality of layers comprises:
filtrating a second secondary layer for displaying advertisement content and at least one control from the secondary layers in the plurality of layers other than the main layer;
when the main layer is in the landscape orientation mode, an updated region of the second secondary layer is one region with a preset shape, and a ratio of an area of the corresponding updated region of the second secondary layer to an area of the screen is less than a preset ratio, determining the second secondary layer as the target layer.

7. The method according to claim 1, further comprising:
prohibiting playing a voice corresponding to the target layer when the layers in the plurality of layers other than the target layer are composed into the image to be displayed and the image to be displayed is sent to the screen for displaying.

8. A mobile terminal, comprising a memory, a processor, and computer programs stored in the memory and executable on the processor, wherein the processor is configured to perform the following acts when executes the computer programs:
receiving a plurality of layers rendered by an application;
determining a target layer from the plurality of layers according to respective layer attribute information corresponding to the plurality of layers, wherein, the layer attribute information comprises at least one of the following: whether cache data is null, whether a display mode matches other layers, an attribute of at least one visible region, an attribute of at least one transparent region, whether there is at least one updated region in a preset period, and an attribute of the at least one updated region, in which the display mode comprises a landscape orientation mode or a portrait orientation mode; and
composing layers in the plurality of layers other than the target layer into an image to be displayed, and sending the image to be displayed to a screen for displaying,
wherein, the attribute of the at least one visible region comprises at least one of the following: whether each of the at least one visible region is null, the number of the at least one visible region, a shape of each of the at least one visible region, a size of each of the at least one visible region, and a position of each of the at least one visible region;
the attribute of the at least one transparent region comprises at least one of the following:
the number of the at least one transparent region, a shape of each of the at least one transparent region, a size of each of the at least one transparent region, a position of each of the at least one transparent region, and a relative position to a visible region of other layers;
the attribute of the at least one updated region comprises at least one of the following:
the number of the at least one updated region, a position of each of the at least one updated region, a shape of each of the at least one updated region, a size of each of the at least one updated region, and a ratio of an area of each of the at least one updated region to an area of the screen.

9. The mobile terminal according to claim 8, wherein processor is configured to receive a plurality of layers rendered by an application by an action of:
    receiving a plurality of visible layers rendered by an application.

10. The mobile terminal according to claim 8, wherein the application comprises a video play application, a layer corresponding to a main video image in the plurality of layers is a main layer;
    determining a target layer from the plurality of layers according to respective layer attribute information corresponding to the plurality of layers comprises:
    determining the target layer from secondary layers in the plurality of layers other than the main layer according to the respective layer attribute information corresponding to the secondary layers in the plurality of layers.

11. The mobile terminal according to claim 9, wherein the application comprises a video play application, a layer corresponding to a main video image in the plurality of layers is a main layer;
    determining a target layer from the plurality of layers according to respective layer attribute information corresponding to the plurality of layers comprises:
    determining the target layer from secondary layers in the plurality of visible layers other than the main layer according to the respective layer attribute information corresponding to the secondary layers in the plurality of layers.

12. The mobile terminal according to claim 10, wherein determining the target layer from secondary layers in the plurality of layers other than the main layer according to the respective layer attribute information corresponding to the secondary layers in the plurality of layers comprises:
    performing the following operations on the respective secondary layers:
    when cache data of a first secondary layer is null, determining the first secondary layer as the target layer; or
    when the at least one visible region of the first secondary layer is null, determining the first secondary layer as the target layer; or
    when the main layer is in the landscape orientation mode and the first secondary layer is in the portrait orientation mode, determining the first secondary layer as the target layer; or
    when the main layer is in the portrait orientation mode and the first secondary layer is in the landscape orientation mode, determining the first secondary layer as the target layer; or
    when the main layer is in a full screen mode and a visible region or a transparent region of the first secondary layer is one rectangle with any side length equal to a side length of the screen, determining the first secondary layer as the target layer; or
    when a visible region of the first secondary layer contains a visible region of the main layer, determining the first secondary layer as the target layer; or
    when there is no updated region in the preset period, determining the first secondary layer as the target layer.

13. The mobile terminal according to claim 10, wherein, determining the target layer from secondary layers in the plurality of layers other than the main layer according to the respective layer attribute information corresponding to the secondary layers in the plurality of layers comprises:
    filtrating a second secondary layer for displaying advertisement content and at least one control from the secondary layers in the plurality of layers other than the main layer;
    when the main layer is in the landscape orientation mode, an updated region of the second secondary layer is one region with a preset shape, and a ratio of an area of the corresponding updated region of the second secondary layer to an area of the screen is less than a preset ratio, determining the second secondary layer as the target layer.

14. The mobile terminal according to claim 8, wherein the processor is further configured to perform an action of:
    prohibiting playing a voice corresponding to the target layer when the layers in the plurality of layers other than the target layer are composed into the image to be displayed and the image to be displayed is sent to the screen for displaying.

15. A non-transitory computer-readable storage medium having stored therein instructions that, when executed by a processor of a mobile terminal, causes the mobile terminal to perform a method for controlling to display in a mobile terminal, the method comprising:
    receiving a plurality of layers rendered by an application;
    determining a target layer from the plurality of layers according to respective layer attribute information corresponding to the plurality of layers, wherein, the layer attribute information comprises at least one of the following: whether cache data is null, whether a display mode matches other layers, an attribute of at least one visible region, an attribute of at least one transparent region, whether there is at least one updated region in a preset period, and an attribute of the at least one updated region, in which the display mode comprises a landscape orientation mode or a portrait orientation mode; and
    composing layers in the plurality of layers other than the target layer into an image to be displayed, and sending the image to be displayed to a screen for displaying,
    wherein, the attribute of the at least one visible region comprises at least one of the following: whether each of the at least one visible region is null, the number of the at least one visible region, a shape of each of the at least one visible region, a size of each of the at least one visible region, and a position of each of the at least one visible region;
    the attribute of the at least one transparent region comprises at least one of the following:
    the number of the at least one transparent region, a shape of each of the at least one transparent region, a size of each of the at least one transparent region, a position of each of the at least one transparent region, and a relative position to a visible region of other layers;
    the attribute of the at least one updated region comprises at least one of the following:
    the number of the at least one updated region, a position of each of the at least one updated region, a shape of each of the at least one updated region, a size of each of the at least one updated region, and a ratio of an area of each of the at least one updated region to an area of the screen.

16. The non-transitory computer-readable storage according to claim 15, wherein receiving a plurality of layers rendered by an application comprises:
    receiving a plurality of visible layers rendered by an application.

17. The non-transitory computer-readable storage according to claim 15, wherein the application comprises a video play application, a layer corresponding to a main video image in the plurality of layers is a main layer;
  determining a target layer from the plurality of layers according to respective layer attribute information corresponding to the plurality of layers comprises:
  determining the target layer from secondary layers in the plurality of layers other than the main layer according to the respective layer attribute information corresponding to the secondary layers in the plurality of layers.

18. The non-transitory computer-readable storage according to claim 17, wherein determining the target layer from secondary layers in the plurality of layers other than the main layer according to the respective layer attribute information corresponding to the secondary layers in the plurality of layers comprises:
  performing the following operations on the respective secondary layers:
  when cache data of a first secondary layer is null, determining the first secondary layer as the target layer; or
  when the at least one visible region of the first secondary layer is null, determining the first secondary layer as the target layer; or
  when the main layer is in the landscape orientation mode and the first secondary layer is in the portrait orientation mode, determining the first secondary layer as the target layer; or
  when the main layer is in the portrait orientation mode and the first secondary layer is in the landscape orientation mode, determining the first secondary layer as the target layer; or
  when the main layer is in a full screen mode and a visible region or a transparent region of the first secondary layer is one rectangle with any side length equal to a side length of the screen, determining the first secondary layer as the target layer; or
  when a visible region of the first secondary layer contains a visible region of the main layer, determining the first secondary layer as the target layer; or
  when there is no updated region in the preset period, determining the first secondary layer as the target layer.

19. The non-transitory computer-readable storage according to claim 17, wherein, determining the target layer from secondary layers in the plurality of layers other than the main layer according to the respective layer attribute information corresponding to the secondary layers in the plurality of layers comprises:
  filtrating a second secondary layer for displaying advertisement content and at least one control from the secondary layers in the plurality of layers other than the main layer;
  when the main layer is in the landscape orientation mode, an updated region of the second secondary layer is one region with a preset shape, and a ratio of an area of the corresponding updated region of the second secondary layer to an area of the screen is less than a preset ratio, determining the second secondary layer as the target layer.

20. The non-transitory computer-readable storage according to claim 17, wherein the method further comprises:
  prohibiting playing a voice corresponding to the target layer when the layers in the plurality of layers other than the target layer are composed into the image to be displayed and the image to be displayed is sent to the screen for displaying.

* * * * *